US010962015B2

(12) United States Patent
Xiao et al.

(10) Patent No.: US 10,962,015 B2
(45) Date of Patent: Mar. 30, 2021

(54) METHODS AND APPARATUS FOR PROVIDING ESP STAGE SEQUENTIAL ENGAGEMENT

(71) Applicant: Saudi Arabian Oil Company, Dhahran (SA)

(72) Inventors: Jinjiang Xiao, Dhahran (SA); Brian A. Roth, Dhahran (SA); Rafael Adolfo Lastra, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 694 days.

(21) Appl. No.: 15/137,511

(22) Filed: Apr. 25, 2016

(65) Prior Publication Data

US 2017/0306731 A1 Oct. 26, 2017

(51) Int. Cl.
| | |
|---|---|
| *F04D 13/08* | (2006.01) |
| *F04B 47/06* | (2006.01) |
| *F16D 23/06* | (2006.01) |
| *F04D 13/12* | (2006.01) |
| *F04D 13/10* | (2006.01) |
| *E21B 43/12* | (2006.01) |

(Continued)

(52) U.S. Cl.
CPC .......... *F04D 13/086* (2013.01); *E21B 43/128* (2013.01); *F04B 47/06* (2013.01); *F04D 13/021* (2013.01); *F04D 13/08* (2013.01); *F04D 13/10* (2013.01); *F04D 13/12* (2013.01); *F16D 23/06* (2013.01); *F04D 1/00* (2013.01)

(58) Field of Classification Search
CPC ........ E21B 43/128; F04B 47/06; F16D 23/06; F04D 13/08; F04D 1/00; F04D 13/021; F04D 13/10

USPC ................................................. 464/1, 3, 5, 6
See application file for complete search history.

(56) References Cited

U.S. PATENT DOCUMENTS

| 2,311,893 A | 2/1943 | Weatherby |
| 3,269,324 A * | 8/1966 | Atta ........................ F04D 13/10 |
| | | 415/199.2 |
| 3,802,803 A | 4/1974 | Bogdanov et al. |

(Continued)

FOREIGN PATENT DOCUMENTS

DE  102009060906 A1  7/2011

OTHER PUBLICATIONS

International Search Report and Written Opinion for related PCT application PCT/US2017/029313 dated Sep. 25, 2017.

*Primary Examiner* — Charles G Freay
(74) *Attorney, Agent, or Firm* — Bracewell LLP; Constance G. Rhebergen; Linda L. Morgan

(57) ABSTRACT

A method for providing artificial lift with an electric submersible pump system includes providing an electric submersible pump system having a motor, a pump assembly, a seal assembly, and a shaft assembly extending along a central axis from the motor to the pump assembly. The pump assembly includes two or more pump sections and a coupling with a transmission mechanism is located between the two or more pump sections. The motor rotates a motor shaft segment of the shaft assembly that is in engagement with a first pump section and starts the first pump section. One of the transmission mechanisms is moved from a disengaged position to an engaged position where the coupling conveys the rotation of the motor shaft segment to the adjacent shaft segment and starts another of the two or more pump sections.

10 Claims, 5 Drawing Sheets

(51) Int. Cl.
    *F04D 13/02*     (2006.01)
    *F04D 1/00*     (2006.01)

(56) References Cited

U.S. PATENT DOCUMENTS

| | | | |
|---|---|---|---|
| 3,961,859 A | 6/1976 | Cygnor et al. | |
| 4,262,786 A * | 4/1981 | Taylor | F16D 41/12 |
| | | | 192/46 |
| 4,662,071 A | 5/1987 | Hoppner et al. | |
| 4,674,276 A * | 6/1987 | Kitaguchi | F02C 3/10 |
| | | | 60/39.163 |
| 5,573,063 A * | 11/1996 | Morrow | E21B 43/121 |
| | | | 166/68.5 |
| 6,012,559 A * | 1/2000 | Yamamoto | F16F 15/131 |
| | | | 192/30 V |
| 6,811,382 B2 | 11/2004 | Buchanan et al. | |
| 6,964,299 B2 | 11/2005 | Scarsdale | |
| 8,123,458 B2 | 2/2012 | Racer et al. | |
| 8,517,693 B2 | 8/2013 | Martin et al. | |
| 2005/0061095 A1* | 3/2005 | Yoshino | F16D 23/06 |
| | | | 74/339 |
| 2010/0272504 A1* | 10/2010 | Sheth | F04D 13/022 |
| | | | 403/287 |
| 2010/0319926 A1 | 12/2010 | Reid | |
| 2011/0038737 A1 | 2/2011 | Conry et al. | |
| 2012/0011857 A1 | 1/2012 | Becker et al. | |
| 2014/0262259 A1 | 9/2014 | Fouillard et al. | |
| 2015/0037171 A1 | 2/2015 | Orrego et al. | |
| 2015/0167657 A1* | 6/2015 | Van Dam | F04D 25/0686 |
| | | | 417/43 |
| 2017/0037912 A1* | 2/2017 | Bower | F16D 11/14 |

\* cited by examiner

METHODS AND APPARATUS FOR PROVIDING ESP STAGE SEQUENTIAL ENGAGEMENT

BACKGROUND OF THE DISCLOSURE

1. Field of the Disclosure

The disclosure relates generally to artificial lift systems for subterranean wells, and more particularly to couplings between pump stages in electric submersible pumps.

2. Description of the Related Art

An electric submersible pump (ESP) is an artificial lift method used in lifting well fluids from downhole in a subterranean well to the surface, or is used on the surface for transferring fluid from the well site to other equipment or facility for further processing. An ESP system can include a pump, which can be centrifugal, a seal or protector, a motor, and a monitoring sub. The pump is used to lift the fluid to the surface. The motor provides the energy required to drive the pump. The protector absorbs the thrust load from the pump, transmits power from the motor to the pump and prevents well-fluid from entering the motor. The monitoring sub provides information on the well fluid characteristics such as pump intake and discharge pressures, pump intake temperature, motor internal temperature, vibration, as well as other desired parameters. In certain ESP systems, the pump consists of stages, which are made up of impellers and diffusers. The impeller, which is rotating, adds energy to the fluid to provide head, whereas the diffuser, which is static, converts the kinetic energy of fluid from the impeller into head. The pump stages are typically stacked in series to form a multi-stage system. The sum of head generated by each individual stage is summative; hence, the total head developed by the multi-stage system is increased.

One common challenge with ESP operations is solid precipitation and deposition on the ESP string including the motor housing, pump intake, stages (impellers & diffusers) and discharge. The majority of the solid compositions are one or more types of scales ($CaCO_3$, $CaSO_4$, $SrSO_4$ CaMg$(CO_3)_2$) and corrosion products. Deposition of solids can result in an increase in ESP trips due to motor high current spikes, high temperature, or overload. Motor burn can occur because scale and corrosion buildup in the pump forces the motor to work harder and in overload (higher temperature) condition. Some ESP wells cannot restart with normal procedures after a shutdown because the shafts are locked up. Several methods can be used to free a locked pump; among them a process called rocking start utilizing the variable speed drive (VSD), acid injection, fluid recirculation and direct on line start. When a rocking start procedure fails to unfreeze the pump, attempts will be made to circulate fluids or to bullhead a combination of acid and solvent to dissolve the solid and dislodge the pump. Even though the acid concentration is carefully designed, corrosion damage to tubing and ESP can occur. In addition, the process is not always effective. After all attempts fail to restart ESPs, the last resort is to work over the well and pull out and replace the non-functional ESPs. To increase ESP reliability and run life, continuous chemical injection is being considered. However, retrofitting a field with continuous chemical injection is a major undertaking.

In conventional ESP systems, all pump stages are on the same shaft and start rotating at the same time as the system is started up. If there is debris or solid buildup in pump stages, the motor may not be able to provide sufficient torque to overcome the initial system inertia or the shaft can be broken due to the high torque applied.

SUMMARY OF THE DISCLOSURE

Embodiments disclosed herein provide a solution to avoid or reduce the possibility of shaft damage as a result of sticking pump situations. Systems and method of this disclosure also reduce the possibility of shaft breakage when a direct on line starter is used to start ESPs instead of a variable speed drive. Embodiments disclosed herein describe systems and methods to couple pump stages in an electric submersible pump system that allows for the sequential engagement of pump sub-sections with a transmission mechanism. The sequential engagement reduces the system inertia required at startup of the ESP, consequently reducing the possibility of shaft damage when one of the sub-sections sticks due to mechanical damage, sand, scale, or any other foreign matter.

In an embodiment of this disclosure, a method for providing artificial lift includes providing an electric submersible pump system, the electric submersible pump system having a motor, a pump assembly, a seal assembly located axially between the motor and the pump assembly, and a shaft assembly extending along a central axis from the motor to the pump assembly, wherein the pump assembly includes two or more pump sections and a coupling with a transmission mechanism is located between the two or more pump sections. The electric submersible pump system is lowered into a subterranean well. Power is provided to the motor to rotate a motor shaft segment of the shaft assembly, the motor shaft segment being in engagement with a first pump section of the two or more pump sections so that a rotation of the motor shaft segment starts the first pump section. The transmission mechanism is moved from a disengaged position where the coupling prevents the transmission of the rotation of the motor shaft segment to an adjacent shaft segment, to an engaged position where the coupling conveys the rotation of the motor shaft segment to the adjacent shaft segment and starts another of the two or more pump sections.

In alternate embodiments, the transmission mechanism can be moved from the disengaged position to the engaged position when the motor shaft segment is rotating, and can be moved from the engaged position to the disengaged position when the motor shaft segment is static. Each transmission mechanism that was moved to the engaged position can remain in the engaged position while the motor shaft segment is rotating.

In other alternate embodiments, the transmission mechanism can include a synchromesh clutch assembly and moving the transmission mechanism from the disengaged position to the engaged position can include bringing the speed of rotation of the adjacent shaft segment up to a speed of the motor shaft segment with the synchromesh clutch assembly. Alternately, the transmission mechanism can have an inertial assembly so that moving the transmission mechanism from the disengaged position to the engaged position can include bringing the speed of the motor shaft segment to sufficient speed to cause the transmission mechanism to move from the disengaged position to the engaged position with the inertial assembly. Moving the transmission mechanism from the disengaged position to the engaged position can include actuating the transmission mechanism with an assembly selected from one of a manual clutch, a hydraulic control line and an electric actuator. The electric submersible pump system can be used to artificially lift fluids within a wellbore, and the two or more pump sections can artificially lift the fluids in series. The first pump section can have a fluid outlet in fluid communication with a fluid inlet of an adjacent one of the two or more pump sections and artificially lifting the fluids in series can include pumping the fluid through the fluid outlet and into the fluid inlet.

In an alternate embodiment of this disclosure, a method for providing artificial lift with an electric submersible pump system includes providing an electric submersible pump system having a motor, a pump assembly, a seal assembly located axially between the motor and the pump assembly, and a shaft assembly extending along a central axis from the motor to the pump assembly, wherein the pump assembly includes two or more pump sections and a coupling with a transmission mechanism is located between the two or more pump sections. Electric submersible pump system is lowered into a subterranean well. Power is provided to the motor to rotate a motor shaft segment of the shaft assembly, the motor shaft segment being in engagement with a first pump section of the two or more pump sections so that a rotation of the motor shaft segment starts the first pump section. The transmission mechanism between the first pump section and a second pump section can be moved from a disengaged position where the coupling prevents the transmission of the rotation of the motor shaft segment to a second shaft segment, to an engaged position where the coupling conveys the rotation of the motor shaft segment to the second shaft segment and starts the second pump section.

In alternate embodiments, the two or more pump sections can further include sequential pump sections that are located sequentially adjacent to the second pump section, each sequential pump section including a sequential shaft segment that rotates with the motor shaft segment when a sequential coupling is in the engaged position, and the method can further include moving the transmission mechanism associated with one of the sequential pump sections from the disengaged position where the coupling prevents the transmission of the rotation of the motor shaft segment to a sequential shaft segment, to the engaged position where the coupling conveys the rotation of the motor shaft segment to the sequential shaft segment and starts the sequential pump section.

In other alternate embodiments, each transmission mechanism that has been moved to the engaged position can remain in the engaged position while the motor shaft segment is rotating. The transmission mechanisms can include a synchromesh clutch assembly and moving the transmission mechanism between the first pump section and the second pump section from the disengaged position to the engaged position can include bringing a speed of rotation of the second shaft segment up to a speed of the motor shaft segment with the synchromesh clutch assembly. The electric submersible pump system can be used to artificially lift fluids within a wellbore, wherein the two or more pump sections artificially lift the fluids in series.

In another alternate embodiment of this disclosure, an electric submersible pump system for providing artificial lift includes a motor, a pump assembly, and a seal assembly located axially between the motor and the pump assembly. A shaft assembly extends along a central axis from the motor to the pump assembly. The pump assembly includes two or more pump sections and a coupling is located between the two or more pump sections. The shaft assembly includes a series of shaft segments, each shaft segment having an end located at a coupling. At least one coupling has a transmission mechanism moveable between a disengaged position where the coupling prevents the transmission of a rotation of one of the shaft segment to an adjacent shaft segment, and an engaged position where the coupling conveys the rotation of the one of the shaft segment to the adjacent shaft segment.

In alternate embodiments, one of the two or more pump sections can be a first pump section that is closest to the motor, the first pump section being rotationally engaged with a motor shaft segment of the shaft assembly so that the first pump section is engaged with the motor. One of the two or more pump sections can be a second pump section that is adjacent to the first pump section, the second pump section including a second shaft segment that is rotationally engaged with the motor shaft segment so that the second shaft segment rotates with the motor shaft segment when a first coupling is in the engaged position. The two or more pump sections can include sequential pump sections that are located sequentially adjacent to the second pump section, each sequential pump section including a sequential shaft segment that rotates with the motor shaft segment when a sequential coupling is in the engaged position.

In other alternate embodiments, each pump section can be in engagement with a shaft segment both when any transmission mechanism is in the disengaged position and when any transmission mechanism is in the engaged position. One of the two or more pump sections can be a first pump section that is closest to the motor, the first pump section having a fluid outlet in fluid communication with a fluid inlet of a second pump section that is adjacent to the first pump section. Each transmission mechanism can be moveable from the disengaged position to the engaged position when the shaft assembly is rotating and each transmission mechanism can be moveable from the engaged position to the disengaged position when the shaft assembly is static.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
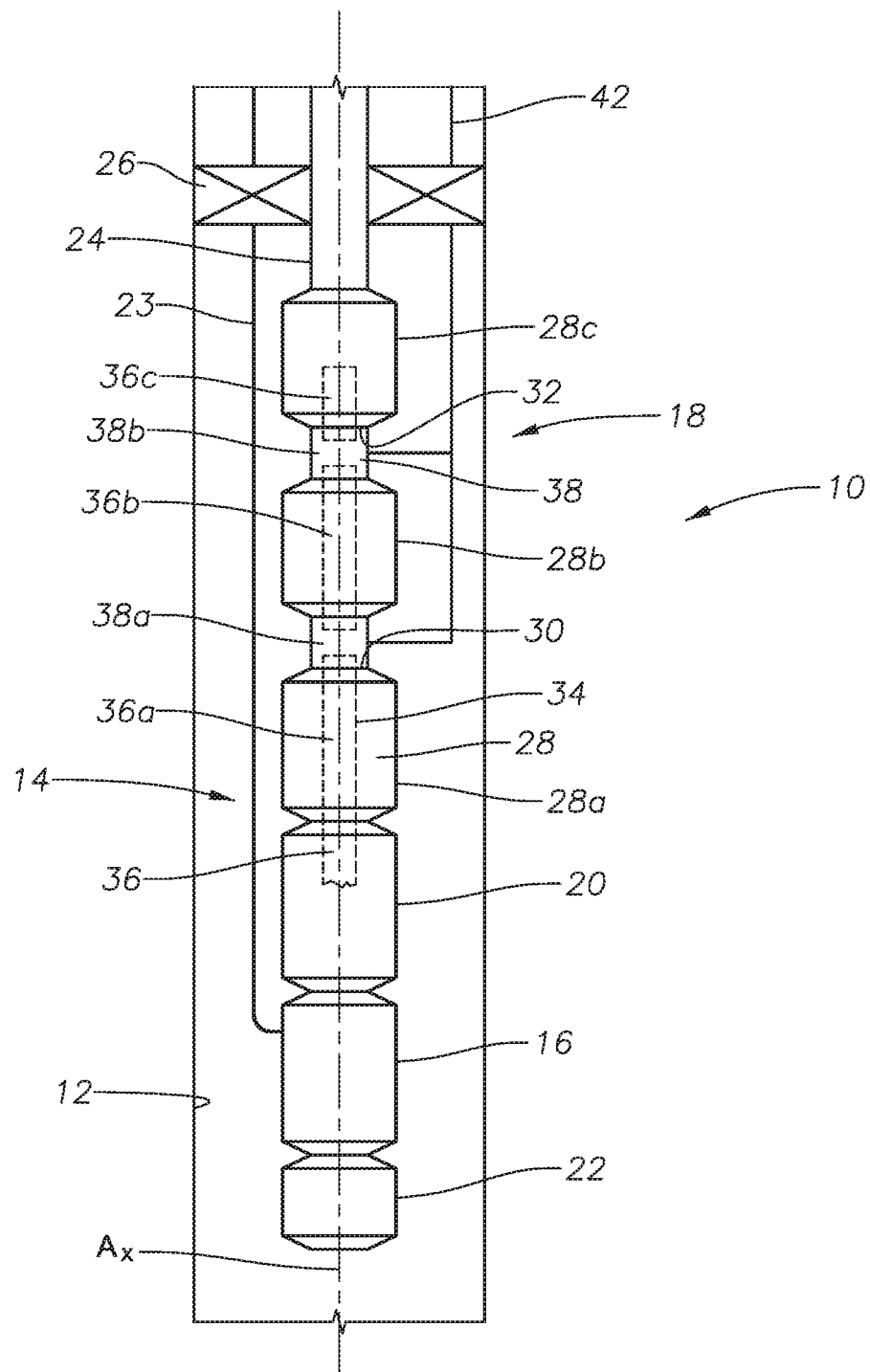
FIG. 1 is a schematic section view of a subterranean well with an artificial lift system in accordance with an embodiment of this disclosure.

Looking at FIG. 1, subterranean well 10 includes wellbore 12. ESP 14 is located within wellbore 12. ESP 14 of FIG. 1 includes motor 16 which is used to drive a pump assembly 18 at an upper portion of ESP 14. Motor 16 can be, for example, an AC or DC induction motor or permanent magnet motor. Between motor 16 and pump assembly 18 is seal section 20. Seal section 20 can protect motor 16 from contamination by wellbore fluids, equalizing pressure within ESP 14 with that of wellbore 12, and absorb the axial thrust produced by pump assembly 18. ESP 14 can also include sensor 22 for monitoring conditions within wellbore 12. Sensor 22 can measure, as an example, characteristics such as pump intake and discharge pressures, pump intake temperature, motor internal temperature, vibration, and other desired parameters. Power cable 23 can be used to both provide power to motor 16 and to communicate with sensor 22.

Fluid within wellbore 12 can enter ESP at a lower end of pump assembly 18 and travel to the surface by way of tubing 24. Packer 26 can seal between an outer diameter of tubing 24 and an inner diameter of wellbore 12 so that fluids produced to the surface are from a selected interval of wellbore 12.

Pump assembly 18 includes a number of pump sections 28. In certain embodiments, there can be two or more pump sections 28 and in the example of FIG. 1, pump assembly 18 includes three pump sections 28. Pump sections 28 are configured in series so that fluids from wellbore 12 being produced to the surface travel through each of the pump sections 28 in succession. In order to allow the fluids to travel through pump sections 28, fluids can travel through outlet 30 on one of the pump sections 28 into inlet 32 into an adjacent pump section 28.

Each pump section 28 is driven by shaft assembly 34. Shaft assembly 34 extends along central axis Ax. Shaft assembly 34 includes a series of shaft segments 36. Shaft segments 36 can be connected together with couplings 38. A coupling 38 is located between each pump section 28. In the example of FIG. 1, at least one end of each shaft segment 36 has an end located at a coupling 38. Coupling 38 can connect each of the shaft segments 36 together so that they rotate together and act as a single shaft that extends along central axis Ax between motor 16 and each pump section 28. The two or more pump sections 28 include sequential pump sections, and each sequential pump section has a sequential shaft segment 36 that rotates with motor shaft segment 36a when a sequential coupling 38 is in the engaged position.

Coupling 38 includes transmission mechanism 40. Transmission mechanism 40 can move between a disengaged position where coupling 38 does not transmit rotation between adjacent shaft segments 36, and an engaged position where coupling 38 transmits rotation between adjacent shaft segments 36. Each transmission mechanism 40 is moveable from the disengaged position to the engaged position when at least a portion of shaft assembly 34 is rotating to allow for sequential startup of successive pump sections 28. Transmission mechanisms 40 can remain in the engaged position when motor 16 is powered and ESP 14 is operating. Each transmission mechanism 40 can be moved to the disengaged position when motor 16 is stopped, ESP 14 is not operating, or shaft assembly 34 static, so that transmission mechanisms 40 can again be sequentially moved to the engaged position to re-start pump sections 28 sequentially Each pump section 28 is in engagement with one of the shaft segments 36 throughout the operation of ESP 14, including both when any transmission mechanism 40 is in the disengaged position and when any transmission mechanism 40 is in the engaged position. Therefore when coupling 38 engages ends of adjacent shaft segments 36, such shaft segments will rotate together and cause both associated pump sections 28 to operate.

As an example, looking at FIG. 1, motor shaft segment 36a can rotate when motor 16 is running. Motor shaft segment 36a can be in engagement with first pump section 28a and can operate first pump section 28a when power is provided to motor 16. First pump section 28a can be the pump section that is closest to motor 16. In this way, rotation of motor shaft segment 36a can start first pump section 28a.

When first pump section 28a has been started and is rotating, if first coupling 38a that is between first pump section 28a and an adjacent pump section such as second section pump section 28b has a transmission mechanism 40 (FIGS. 2-8) that is in the disengaged position, first coupling 38a prevents the transmission of the rotation of motor shaft segment 36a to an adjacent or second shaft segment 36b. Second shaft segment 36b engages second pump section 28b and so when transmission mechanism 40 of first coupling 38a is moved to the engaged position, first coupling 38a conveys the rotation of motor shaft segment 36a to the adjacent second shaft segment 36b and starts the adjacent second pump section 28b.

Similarly, when second pump section 28b has been started and is rotating, if second coupling 38b that is between second pump section 28b and an adjacent pump section such as third section pump section 28c has a transmission mechanism 40 (FIGS. 2-8) that is in the disengaged position, second coupling 38b prevents the transmission of the rotation of second shaft segment 36b to an adjacent or third shaft segment 36c. Third shaft segment 36c engages third pump section 28c and so when transmission mechanism 40 of second coupling 38b is moved to the engaged position, second coupling 38b conveys the rotation of motor shaft segment 36a to the third shaft segment 36c by way of second shaft segment 36b and starts the third pump section 28c. In embodiments with more than three pump sections 28, this process can be repeated to start each of the pump sections 28. By starting each pump section 28 sequentially the torque and electric power required to start ESP 14 can be reduced, burnout of motor 16 and damage to shaft assembly 34 can be avoided, and any lock-up of shaft assembly 34, this lock-up can be unfrozen.

Transmission mechanism 40 can be activated mechanically, hydraulically, electrically, electro-magnetically. In other embodiments the transmission mechanism 40 is a mechanical clutch. Transmission mechanism 40 can be powered, monitored and controlled through transmission line 42. As an example, transmission line 42 can be a hydraulic line, a power line, or a control line, or other type of communications line, as applicable. Transmission line 42 can extend from the surface to transmission mechanism 40 of each coupling 38.

Figure 3:
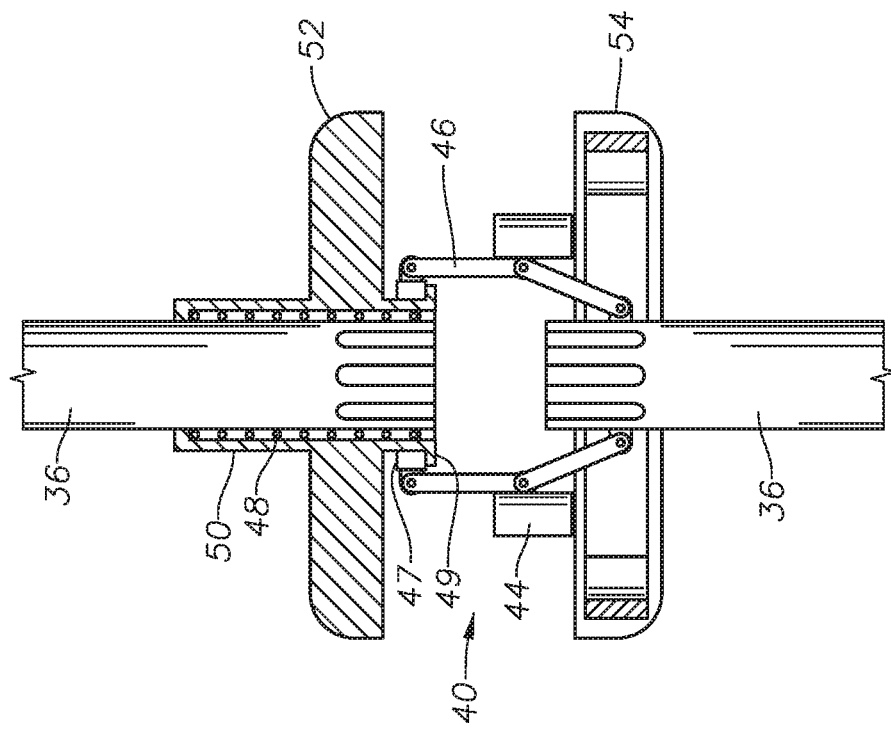
FIG. 3 is a section view of the coupling of FIG. 2, shown in the disengaged position.
Figure 2:
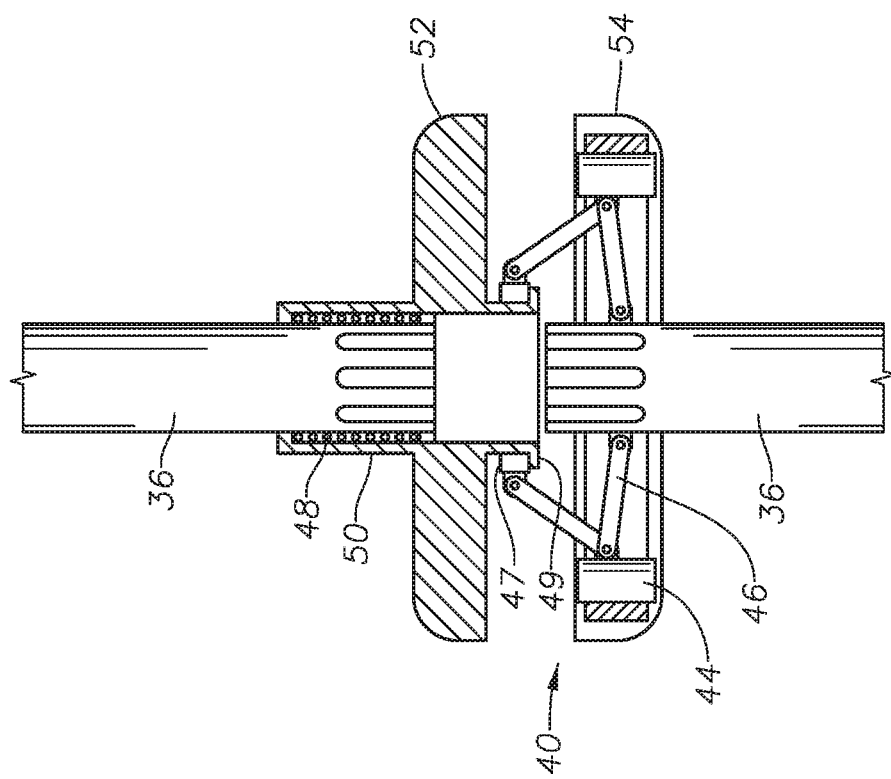
FIG. 2 is a schematic section view of a coupling in accordance with an embodiment of this disclosure, shown in the engaged position.
Figure 4:
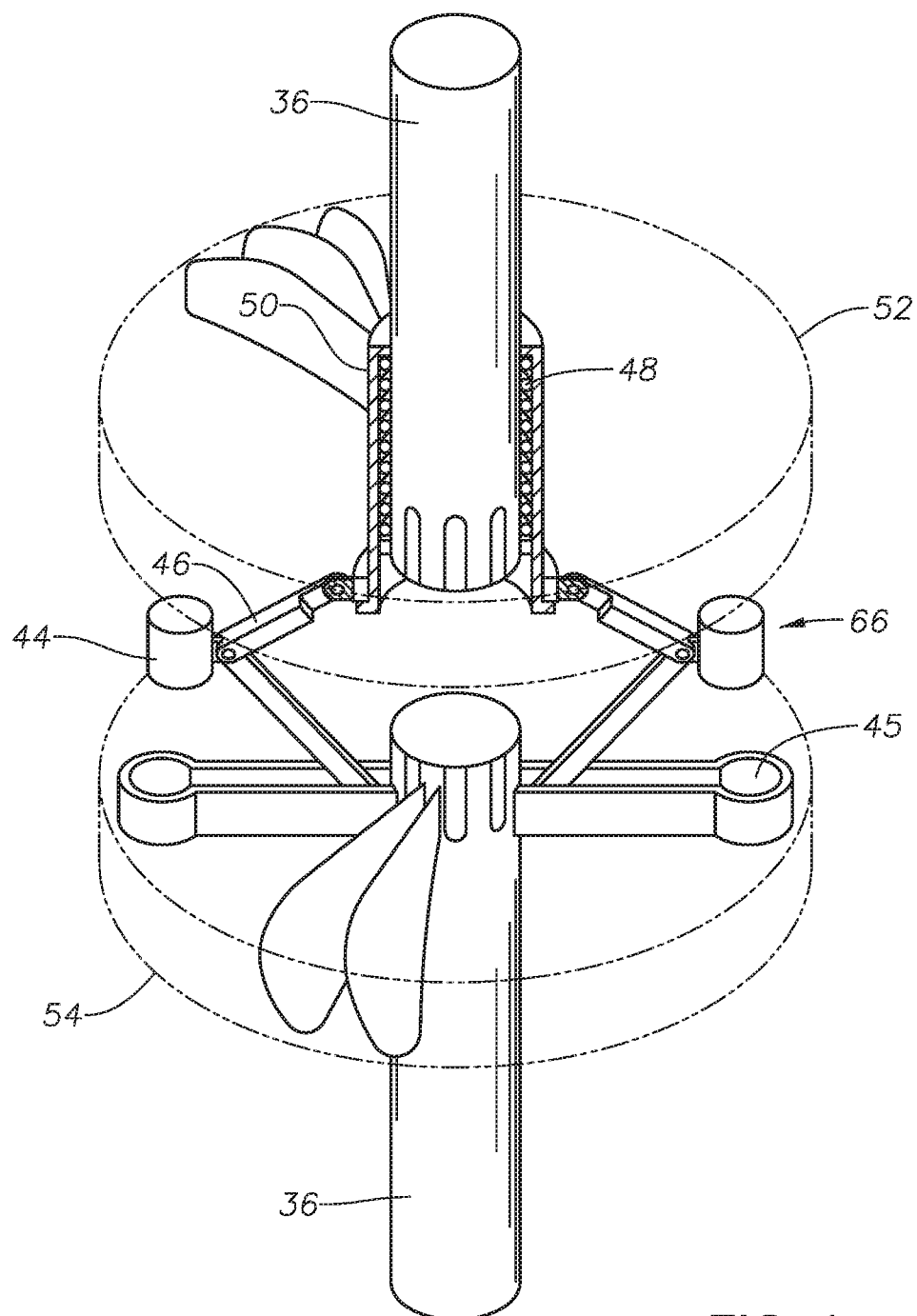
FIG. 4 is a perspective view of the coupling of FIG. 2, shown in between the disengaged position and the engaged position.

Looking at FIGS. 2-4, in an example embodiment, transmission mechanism 40 can be an inertial assembly. In an inertial assembly transmission mechanism 40 can move from the disengaged position (FIG. 3) to the engaged position (FIG. 2) on its own when a rotational speed of one of the shaft segments 36 associated with the transmission mechanism 40 reaches a given value. In the example of FIGS. 2-4, transmission mechanism 40 includes weights 44. Weights 44 can move from a radially inward location to a radially outward location as a result of the rotation of transmission mechanism 40. When weights 44 move rotationally outward, they can engage weight slots 45 and fans 52 and 54 slowly get close to one another but never contact, to form a non-contact fluid coupling that allows them to rotate together.

Looking at FIG. 3, transmission mechanism 40 includes weights 44 on hinge 46. Hinge 46 can move from an extended position (FIG. 3) to a retracted position (FIG. 2). An end of hinge 46 can be secured to ring 47 that circumscribes collar 50 and is rotationally independent of collar 50. Ring 47 can be supported by radial shoulder 49 of collar 50. Collar 50 is rotationally fixed to fan 52 and one of the shaft segments 36, shown as an example as the upper shaft. Collar 50 and fan 52 can move axially along one of the shaft segments 36, shown as an example as the upper shaft.

Spring 48 biases hinge 46 in an extended position with weights 44 located radially closer to an outer diameter of shaft segment 36. Collar 50 and fan 52 rotate independently from hinge 46. As hinge 46 moves between the extended position and the retracted position, ring 47 can pull on radial shoulder 49 of collar 50. Collar 50 can be a ring shaped member and have grooves on an inner diameter surface that can engage outer teeth of upper shaft segment 36.

Weights 44 are rotationally fixed to one of the shaft segments 36, shown as an example as the lower shaft segment 36 of FIG. 3. As such shaft segment 36 rotates, weights 44 will also rotate. Fan 54 will also rotate with such shaft segment 36. Fans 52, 54 are integral to the coupling as they form a non-contact fluid coupling that allow slippage during acceleration and form a solid coupling when the two shafts 36 rotate at the same speed. This type of coupling also allows disengagement at high loads without mechanical damage.

Looking at FIG. 4, as weights 44 rotate, they will move radially outward by centrifugal force, overcoming the bias of spring 48. As weights 44 move radially outward, hinge 46 moves from the extended position towards the retracted position, causing weights 44, collar 50 and fan 52 to also move axially towards the other fan 54 which is rotating. Weights 44 move axially closer to weight slots 45 and collar 50 and fan 52 moves closer to fan 54 slowly forming a fluid coupling.

Looking at FIG. 2, when weights 44 rotate with sufficient speed so that hinge 46 is in the retracted position, fan 54 will apply a drag type force on the second fan 52 causing second fan 52 to rotate at the same speed as first fan 54 forming a rotational connection between adjacent shaft segments 36 so that adjacent shaft segments 36 rotate together. In this configuration, transmission mechanism 40 is in the engaged position and pump section 28 associated with previously non or slow moving shaft segment 36 is started. Transmission mechanism 40 will remain in the engaged position for as long as shaft segments 36 continue to rotate at sufficient speed. Transmission mechanism 40 can return to the disengaged position when motor 16 is stopped or shaft segments 36 otherwise stop rotating with sufficient speed.

Looking at FIGS. 5-8, in an alternate example of transmission mechanism 40, transmission mechanism 40 can include a synchromesh clutch assembly. In the synchromesh clutch assembly of FIGS. 5-8, when moving transmission mechanism 40 from the disengaged position to the engaged position, the speed of adjacent shaft segments 36 will be brought up to similar speeds, which will be the speed of motor shaft segment 36a, before making up the connection between the adjacent shaft segments 36.

Figure 5:
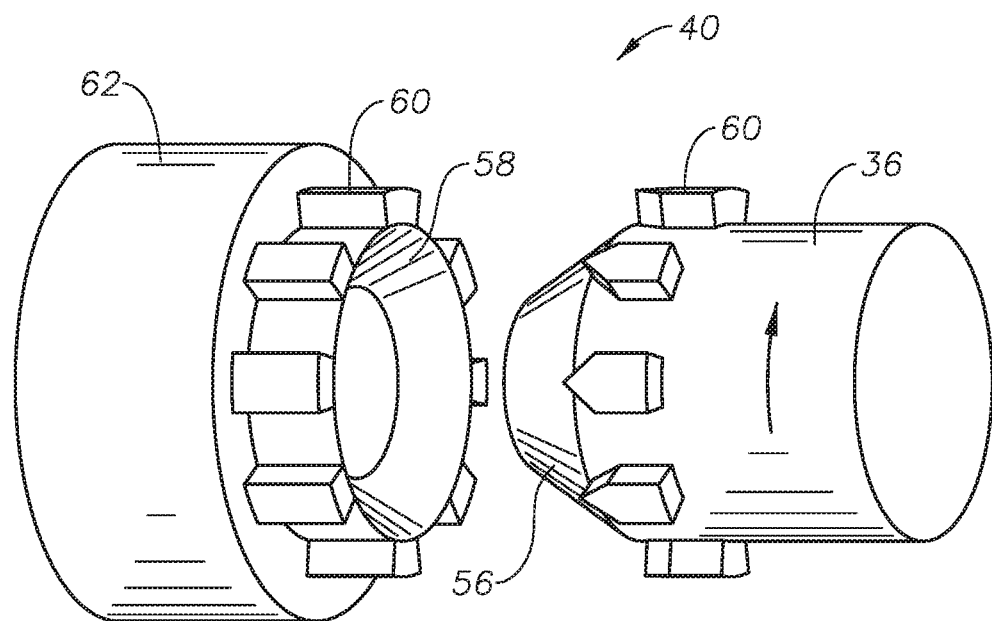
FIG. 5 is a side view of a coupling in accordance with an embodiment of this disclosure, shown in the disengaged position.

Looking at FIG. 5, an end of one of the adjacent shaft segments 36 will have a protruding cone 56 and an end of the other of the adjacent shaft segments 36 will have a recessed cone 58. The ends of adjacent shaft segments 36 will have outer teeth 60. And collar 62 will have grooves that can simultaneously engage the teeth of both of the adjacent shaft segments 36 to rotationally connect the adjacent shaft segments 36 so that the adjacent shaft segments 36 rotate together.

Figure 6:
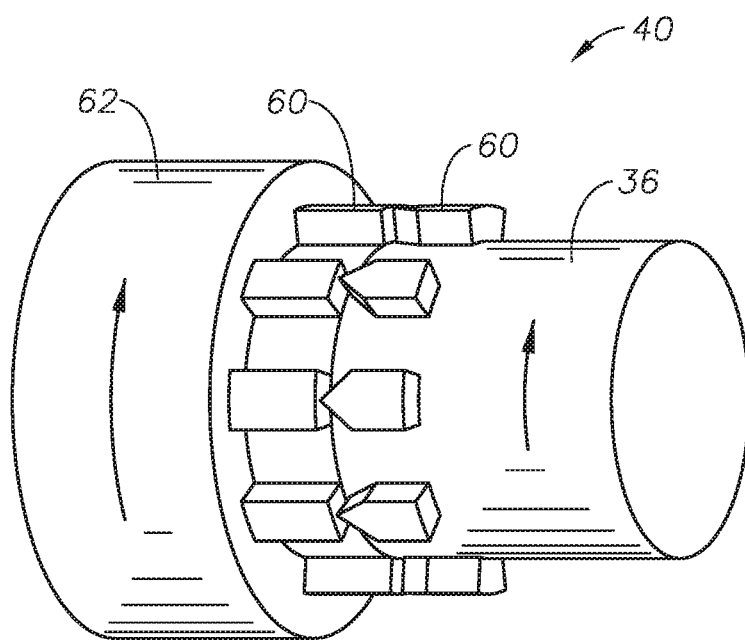
FIG. 6 is a section view of the coupling of FIG. 5, shown in between the disengaged position and the engaged position.
Figure 7:
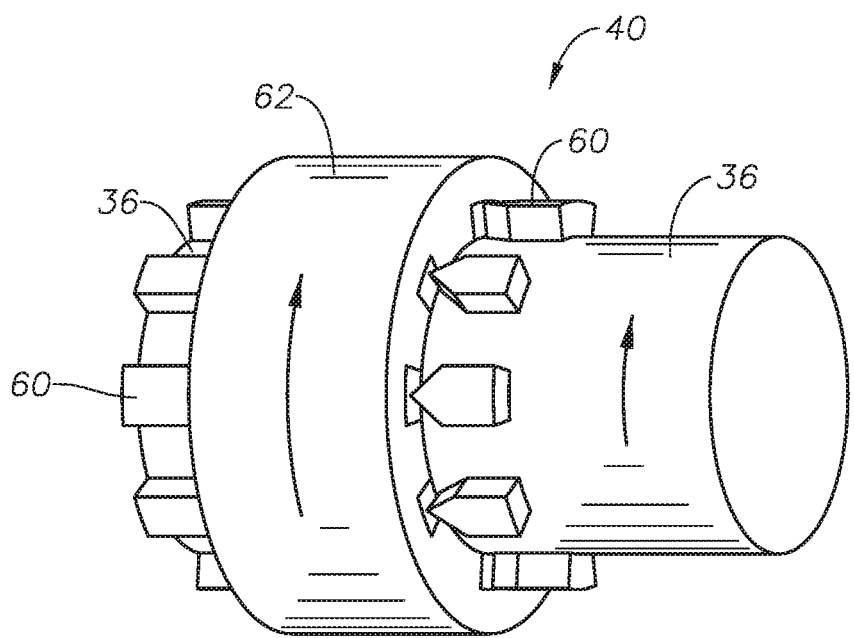
FIG. 7 is a section view of the coupling of FIG. 5, shown in between the disengaged position and the engaged position.
Figure 8:
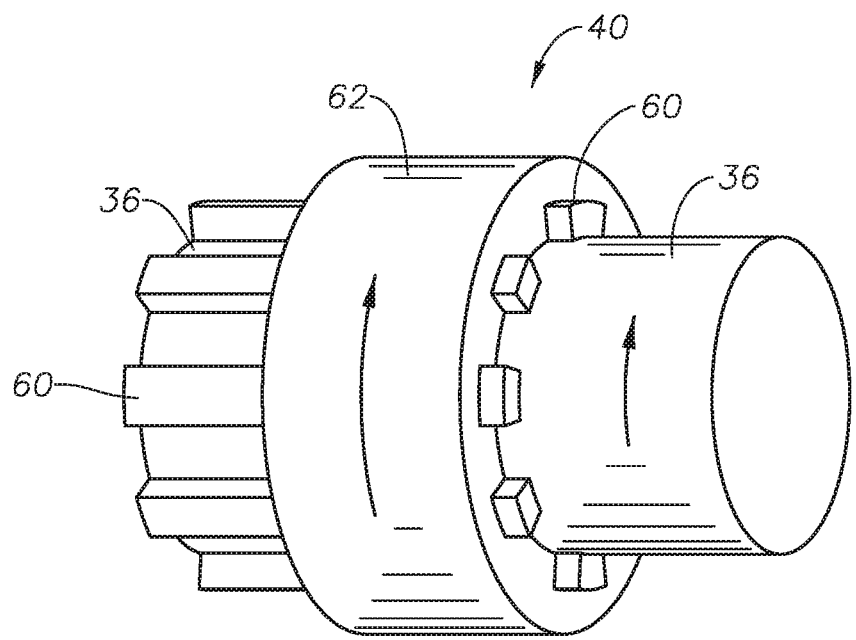
FIG. 8 is a section view of the coupling of FIG. 5, shown in the engaged position.

Looking at FIG. 6, when the adjacent shaft segments 36 are brought together, the friction between protruding cone 56 and recessed cone 58 will cause the non or slower moving shaft segment 36 to rotate and be brought up to the speed of the rotating shaft segment 36. Looking at FIG. 7, once the adjacent shaft segments 36 are rotating at the same speed, collar 62 can move axially along teeth 60 of one of the shaft segments 36 towards the teeth 60 of the other shaft segments 36. A pointed end of the teeth 60 of the other shaft segments 36 can help to align such teeth 60 with the grooves of collar 62 so that collar 62 can bridge the teeth of both of the adjacent shaft segments 36, rotationally connecting adjacent shaft segments 36. In this configuration, transmission mechanism 40 is in the engaged position and pump section 28 associated with previously non or slow moving shaft segment 36 is started.

Although example transmission mechanisms 40 have been shown in FIGS. 2-8, alternate transmission mechanisms 40 can be used that meet the operational requirements of ESP 14 in accordance with embodiments of this disclosure.

In an example of operation, in order to provide artificial lift with an ESP, ESP 14 having motor 16, pump assembly 18, seal section 20, and shaft assembly 34 can be lowered into wellbore 12 of subterranean well 10. Motor 16 can be powered to rotate motor shaft segment 36a that is in engagement with first pump section 28a to start first pump section 28a. After motor shaft segment 36a of shaft assembly 34 is rotating, transmission mechanism 40 between first pump section 28a and second pump section 28b from a disengaged position to an engaged position where coupling 38a conveys the rotation of motor shaft segment 36a to rotate second shaft segment 36b and start second pump section 28b. Further adjacent transmission mechanisms 40 can be similarly moved to engaged positions to start further pump sections 28. Each of the transmission mechanisms 40 can remain in an engaged position while ESP is operating. When ESP 14 is stopped, each transmission mechanism 40 of couplings 38 can be moved back to the disengaged position so that only first pump section 28a is engaged with motor 16.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for providing artificial lift with an electric submersible pump system, the method comprising:
providing an electric submersible pump system having a motor, a pump assembly, a seal assembly located axially between the motor and the pump assembly, and a shaft assembly extending along a central axis from the motor to the pump assembly, wherein the pump assembly includes two or more pump sections and a coupling with a transmission mechanism is located between the two or more pump sections;
lowering the electric submersible pump system into a subterranean well;
providing power to the motor to rotate a motor shaft segment of the shaft assembly, the motor shaft segment being in engagement with a first pump section of the two or more pump sections and operating the first pump section when power is provided to the motor so that a rotation of the motor shaft segment starts the first pump section, and where the transmission mechanism is in a disengaged position where the coupling prevents the transmission of the rotation of the motor shaft segment to an adjacent shaft segment; and
moving the transmission mechanism from the disengaged position to an engaged position where the coupling conveys the rotation of the motor shaft segment to the adjacent shaft segment so that a rotation of the adjacent shaft segment starts another of the two or more pump sections and both the first pump section and the another of the two or more pump sections are operating, where the transmission mechanism is operable to move from the disengaged position to the engaged position inertially by a rotational speed of the motor shaft segment; where
the transmission mechanism includes a synchromesh clutch assembly and wherein moving the transmission mechanism from the disengaged position to the engaged position includes bringing a speed of rotation of the adjacent shaft segment up to a speed of the motor shaft segment with the synchromesh clutch assembly.

2. The method of claim 1, wherein the transmission mechanism is moved from the disengaged position to the engaged position when the motor shaft segment is rotating and is moved from the engaged position to the disengaged position when the motor shaft segment is static.

3. The method of claim 1, wherein each transmission mechanism that has been moved to the engaged position remains in the engaged position while the motor shaft segment is rotating.

4. The method of claim 1, wherein the transmission mechanism has an inertial assembly so that moving the transmission mechanism from the disengaged position to the engaged position includes bringing a speed of motor shaft segment to sufficient speed to cause the transmission mechanism to move from the disengaged position to the engaged position with the inertial assembly.

5. The method of claim 1, further comprising using the electric submersible pump system to artificially lift fluids within a wellbore, wherein the two or more pump sections artificially lift the fluids in series.

6. The method of claim 5, wherein the first pump section has a fluid outlet in fluid communication with a fluid inlet of an adjacent one of the two or more pump sections and wherein artificially lifting the fluids in series includes pumping the fluid through the fluid outlet and into the fluid inlet.

7. A method for providing artificial lift with an electric submersible pump system, the method comprising:
providing an electric submersible pump system having a motor, a pump assembly, a seal assembly located axially between the motor and the pump assembly, and a shaft assembly extending along a central axis from the motor to the pump assembly, wherein the pump assembly includes two or more pump sections;
lowering the electric submersible pump system into a subterranean well;
providing power to the motor to rotate a motor shaft segment of the shaft assembly, the motor shaft segment being in engagement with a first pump section of the two or more pump sections and operating the first pump section when power is provided to the motor so that a rotation of the motor shaft segment starts the first pump section, where the pump assembly includes a coupling with a transmission mechanism that is located between the first pump section and a second pump section of the two or more pump sections, and where the transmission mechanism between the first pump section and the second pump section is in a disengaged position where the coupling prevents the transmission of the rotation of the motor shaft segment to a second shaft segment; and
moving the transmission mechanism between the first pump section and the second pump section from a disengaged position to an engaged position where the coupling conveys the rotation of the motor shaft segment to the second shaft segment so that a rotation of the second shaft segment starts the second pump section and both the first pump section and the second pump section are operating, the transmission mechanism is operable to move from the disengaged position to the engaged position inertially by a rotational speed of the motor shaft segment; where
where the two or more pump sections further includes sequential pump sections that are located sequentially adjacent to the second pump section, each sequential pump section including a sequential shaft segment that rotates with the motor shaft segment when a sequential coupling is in the engaged position, the method further including moving a sequential transmission mechanism associated with one of the sequential pump sections from the disengaged position where the sequential coupling prevents the transmission of the rotation of the motor shaft segment to the sequential shaft segment, to the engaged position where the sequential coupling conveys the rotation of the motor shaft segment to the sequential shaft segment and starts the sequential pump section; and the transmission mechanism between the first pump section and the second pump section includes a synchromesh clutch assembly and wherein moving the transmission mechanism between the first pump section and the second pump section from the disengaged position to the engaged position includes bringing a speed of rotation of the second shaft segment up to a speed of the motor shaft segment with the synchromesh clutch assembly.

8. The method of claim 7, wherein each transmission mechanism that has been moved to the engaged position remains in the engaged position while the motor shaft segment is rotating.

9. The method of claim 7, further comprising using the electric submersible pump system to artificially lift fluids within a wellbore, wherein the two or more pump sections artificially lift the fluids in series.

10. A method for providing artificial lift with an electric submersible pump system, the method comprising:

providing an electric submersible pump system having a motor, a pump assembly, a seal assembly located axially between the motor and the pump assembly, and a shaft assembly extending along a central axis from the motor to the pump assembly, wherein the pump assembly includes two or more pump sections and a coupling with a transmission mechanism is located between the two or more pump sections;

lowering the electric submersible pump system into a subterranean well;

providing power to the motor to rotate a motor shaft segment of the shaft assembly, the motor shaft segment being in engagement with a first pump section of the two or more pump sections and operating the first pump section when power is provided to the motor so that a rotation of the motor shaft segment starts the first pump section, and where the transmission mechanism is in a disengaged position where the coupling prevents the transmission of the rotation of the motor shaft segment to an adjacent shaft segment; and moving the transmission mechanism from the disengaged position to an engaged position where the coupling conveys the rotation of the motor shaft segment to the adjacent shaft segment so that a rotation of the adjacent shaft segment starts another of the two or more pump sections and both the first pump section and the another of the two or more pump sections are operating, where the transmission mechanism is operable to move from the disengaged position to the engaged position inertially by a rotational speed of the motor shaft segment;

wherein the transmission mechanism has an inertial assembly so that moving the transmission mechanism from the disengaged position to the engaged position includes bringing a speed of motor shaft segment to sufficient speed to cause the transmission mechanism to move from the disengaged position to the engaged position with the inertial assembly.

* * * * *

UNITED STATES PATENT AND TRADEMARK OFFICE
CERTIFICATE OF CORRECTION

PATENT NO. : 10,962,015 B2
APPLICATION NO. : 15/137511
DATED : March 30, 2021
INVENTOR(S) : Jinjiang Xiao, Brian A. Roth and Rafael Adolfo Lastra Page 1 of 1

It is certified that error appears in the above-identified patent and that said Letters Patent is hereby corrected as shown below:

In the Claims

In Claim 7, Column 10, Line 55, the claim language reads:
"of the motor shaft segment; where"
It should read:
--of the motor shaft segment;--.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*